US006050457A

United States Patent [19]

Arnold et al.

[11] Patent Number: 6,050,457

[45] Date of Patent: *Apr. 18, 2000

[54] HIGH PRESSURE MANUALLY-ACTUATED SPRAY PUMP

[75] Inventors: Christopher B. Arnold, Cincinnati; Mark T. Lund, West Chester; Donald E. Hershey, Cincinnati, all of Ohio

[73] Assignee: The Procter & Gamble Company, Cincinnati, Ohio

[ * ] Notice: Under 35 U.S.C. 154(b), the term of this patent shall be extended for 234 days.

[21] Appl. No.: 08/568,211

[22] Filed: Dec. 6, 1995

[51] Int. Cl.[7] .................................................. G01F 11/06

[52] U.S. Cl. .................................. 222/321.9; 222/321.1

[58] Field of Search ................................ 222/309, 321.1, 222/321.2, 321.7, 321.9, 385

[56] References Cited

U.S. PATENT DOCUMENTS

| | | | |
|---|---|---|---|
| 459,529 | 9/1891 | White | 222/385 |
| 1,697,234 | 1/1929 | Foyle | 222/385 |
| 1,814,504 | 7/1931 | Collins | 222/309 |
| 2,605,019 | 7/1952 | Cornelius | 222/385 |
| 3,761,022 | 9/1973 | Kondo | 239/333 |
| 3,865,313 | 2/1975 | Kondo | 239/333 |
| 3,921,861 | 11/1975 | Kondo | 222/257 |
| 4,017,031 | 4/1977 | Kishi et al. | 239/333 |
| 4,022,354 | 5/1977 | Kotuby | 222/321 |
| 4,025,046 | 5/1977 | Boris | 239/333 |
| 4,051,983 | 10/1977 | Anderson | 222/321 |
| 4,053,086 | 10/1977 | DeBard | 222/182 |
| 4,053,089 | 10/1977 | Gamadia | 222/321 |
| 4,057,176 | 11/1977 | Horvath | 222/193 |
| 4,061,247 | 12/1977 | Meshberg | 222/1 |
| 4,082,222 | 4/1978 | Boris | 239/331 |
| 4,111,367 | 9/1978 | Hayes | 239/331 |
| 4,122,982 | 10/1978 | Giuffredi | 222/321 |
| 4,144,987 | 3/1979 | Kishi | 222/321 |
| 4,154,374 | 5/1979 | Kirk, Jr. | 222/321 |
| 4,173,297 | 11/1979 | Pettersen | 222/321 |
| 4,183,449 | 1/1980 | Blake | 222/321 |
| 4,189,064 | 2/1980 | O'Neill et al. | 222/321 |

(List continued on next page.)

FOREIGN PATENT DOCUMENTS

| | | |
|---|---|---|
| 0 309 001 A2 | 3/1989 | European Pat. Off. . |
| 3 427 793 | 2/1986 | Germany . |
| 2 004 585 | 4/1979 | United Kingdom . |

OTHER PUBLICATIONS

"Atomization and Sprays 2000", Workshop Sponsored by the National Science Foundation, edited by Norman Chigier, Department of Mechanical Engineering, Carnegie Mellon University, Pittsburgh, PA (pp. 1–25).

Mark IV Fine Mist Sprayer Fact Sheet—1994 Calmar Dispensing Systems Inc.

M300 brochure from Calmar Dispensing Systems.

*Primary Examiner*—Keneth Bomberg
*Attorney, Agent, or Firm*—Leonard W. Lewis

[57] ABSTRACT

A high pressure manually-actuated spray pump for dispensing a fluid. The spray pump comprises a nozzle through which the fluid is dispensed and a pumping engine. The pumping engine comprises a reservoir, a closure, and a plunger. The reservoir has an open top and a closed bottom and an interior surface. The plunger has an outer surface and a longitudinal passageway extending therethrough. The plunger further having an outlet valve mounted therein and an upper end and a lower end. The lower end being slidably disposed within the open top of the reservoir forming an interior chamber within the reservoir. The interior chamber has an annular chamber and a main chamber. The annular chamber being in fluid communication with the main chamber. The annular chamber is formed by the outer surface of the plunger being spaced away from the interior surface of the reservoir such that there is no frictional contact between the outer surface and the interior surface. The closure being attached to the open top of the reservoir allowing the plunger to slidably extend through the closure such that the interior chamber is sealingly closed. The nozzle is mounted on the upper end of the plunger such that the longitudinal passageway is in fluid communication with the nozzle. The interior chamber is separated from the longitudinal passageway by the outlet valve.

1 Claim, 6 Drawing Sheets

U.S. PATENT DOCUMENTS

| | | | |
|---|---|---|---|
| 4,216,883 | 8/1980 | Tasaki et al. | 222/321 |
| 4,228,931 | 10/1980 | Ruscitti et al. | 222/321 |
| 4,231,493 | 11/1980 | Kutik et al. | 222/321 |
| 4,264,037 | 4/1981 | Nozawa | 239/333 |
| 4,361,255 | 11/1982 | Saito et al. | 222/321 |
| 4,369,900 | 1/1983 | Saito et al. | 222/321 |
| 4,434,916 | 3/1984 | Ruscitti et al. | 222/321 |
| 4,437,588 | 3/1984 | Shay | 222/321 |
| 4,503,996 | 3/1985 | Sorm et al. | 222/321 |
| 4,530,449 | 7/1985 | Nozawa et al. | 222/189 |
| 4,606,479 | 8/1986 | Van Brocklin | 222/321 |
| 4,692,103 | 9/1987 | Anderson | 417/547 |
| 4,693,675 | 9/1987 | Venus, Jr. | 417/489 |
| 4,735,347 | 4/1988 | Schultz et al. | 222/321 |
| 4,776,498 | 10/1988 | Maerte et al. | 222/321 |
| 4,895,279 | 1/1990 | Schultz | 222/321 |
| 4,896,799 | 1/1990 | Giuffredi | 222/321 |
| 4,911,336 | 3/1990 | Blake | 222/321 |
| 4,923,094 | 5/1990 | O'Neill | 222/321 |
| 4,930,999 | 6/1990 | Brunet et al. | 417/552 |
| 4,936,492 | 6/1990 | Amiel et al. | 222/207 |
| 4,941,595 | 7/1990 | Montaner et al. | 222/321 |
| 4,944,432 | 7/1990 | Jouillat | 222/321 |
| 4,960,230 | 10/1990 | Marelli | 222/321 |
| 4,964,547 | 10/1990 | Lina | 222/385 |
| 4,984,702 | 1/1991 | Pierpont | 215/272 |
| 4,986,453 | 1/1991 | Lina et al. | 222/321 |
| 5,002,207 | 3/1991 | Giuffredi | 222/340 |
| 5,002,228 | 3/1991 | Su | 239/333 |
| 5,011,046 | 4/1991 | Graf et al. | 222/321 |
| 5,020,696 | 6/1991 | Cater | 222/321 |
| 5,025,958 | 6/1991 | Montaner et al. | 222/321 |
| 5,046,644 | 9/1991 | Cater | 222/321 |
| 5,064,105 | 11/1991 | Montaner | 222/321 |
| 5,083,682 | 1/1992 | Cater | 222/321 |
| 5,088,629 | 2/1992 | O'Neill | 222/321 |
| 5,092,495 | 3/1992 | Andre | 222/341 |
| 5,096,097 | 3/1992 | Lina | 222/385 |
| 5,105,994 | 4/1992 | Jouillat et al. | 222/241 |
| 5,108,013 | 4/1992 | VanBrocklin | 222/321 |
| 5,110,052 | 5/1992 | Graf et al. | 239/333 |
| 5,110,271 | 5/1992 | Hofmann | 417/555.1 |
| 5,115,980 | 5/1992 | Skorka | 222/321 |
| 5,147,073 | 9/1992 | Cater | 222/321 |
| 5,152,435 | 10/1992 | Stand et al. | 222/321 |
| 5,163,588 | 11/1992 | Cater | 222/321 |
| 5,176,296 | 1/1993 | Lina et al. | 222/321 |
| 5,181,635 | 1/1993 | Balderrama | 222/383 |
| 5,183,187 | 2/1993 | Martin et al. | 22/287 |
| 5,190,192 | 3/1993 | Lina et al. | 222/321 |
| 5,192,006 | 3/1993 | Van Brocklin et al. | 222/321 |
| 5,217,148 | 6/1993 | Cater | 222/321 |
| 5,271,532 | 12/1993 | Jumel et al. | 222/321 |
| 5,284,276 | 2/1994 | Cater | 222/321 |
| 5,348,189 | 9/1994 | Cater | 222/1 |
| 5,358,149 | 10/1994 | O'Neill | 222/321 |
| 5,370,281 | 12/1994 | Renault | 222/342 |

HIGH PRESSURE MANUALLY-ACTUATED SPRAY PUMP

FIELD OF THE INVENTION

The present invention relates to an improved non-aerosol spray pump for producing an aerosol-like spray, and more particularly, to an improved non-aerosol spray pump that is capable of generating the high hydraulic pressure required for an ultra fine spray.

BACKGROUND OF THE INVENTION

Today, hand held spray dispensers for hair sprays are typically either of the manually-actuated spray pump type or the aerosol spray type. Aerosol spray dispensers utilize a liquefied propellant that "flashes off", to create an ultra fine spray. These ultra fine sprays have mean droplet diameters or mean particle sizes on the order of about 40 microns. When the propellant "flashes off", the phase change causes the liquid to disintegrate into ligaments and droplets. Although the small mean droplet diameter of ultra fine sprays produced by aerosols tends to leave a desirable dry feel on the hair, aerosols continue to be the subject of environmental debates. Therefore, many consumers prefer to use manually-actuated spray pump dispensers.

Manually-actuated spray pump dispensers or finger pumps rely on the consumer to generate a hydraulic pressure in the pumping engine in order to dispense the fluid. Most pumping engines typically use a standard piston and cylinder arrangement in order to generate this hydraulic pressure. Thus, when the consumer applies an actuation force by pushing downward on the piston, the hydraulic pressure of the fluid in the cylinder is increased. For example, in a pressure swirl nozzle type spray pump dispenser, the hydraulic pressure created in the pumping engine forces fluid into a pressure swirl nozzle that imparts a rotational motion to the fluid. The fluid spins inside of the nozzle and forms a thin conical sheet which exits into the atmosphere and breaks up into ligaments and droplets.

One fluid of current interest that requires the generation of a high hydraulic pressure in order to be properly dispensed by a manually-actuated spray pump dispenser is hair spray. Most manually-actuated spray pump dispensers have been unable to produce sprays having a mean droplet diameter of less than about 55 microns for many of the hair spray fluids currently on the market. These larger mean particle sizes, i.e. greater than about 55 microns, produced by conventional manual spray pumps result in sprays that consumers refer to as "wet". The wet and sticky feel of such sprays is due to the longer drying time required to dry the larger-sized particles. Several methods have been proposed for reducing the mean particle size produced by conventional manual spray pumps, for example, one of which is to increase the amount of hydraulic pressure created within the spray pump. Typically, most conventional spray pumps operate at a hydraulic pressure of about 90 psig. Research has indicated that when the hydraulic pressure in these conventional spray pumps is increased upward to levels near about 200 psig, mean droplet diameters of about 40 microns or less are achievable when used with a swirl type nozzle.

A method of developing a high hydraulic pressure of about 200 psig involves the use of a preloaded or precompression type outlet valve that will not open until the desired high hydraulic pressure (that is 200 psig) is reached. In order to reach these high hydraulic pressures, typically the stiffness of a precompression spring is increased. A stiffer precompression spring will prevent opening of the outlet valve until the desired high hydraulic pressure criteria is met. However, with this type of an outlet valve arrangement, the actuation force to be applied on the plunger that is required to dispense fluid from such a conventional spray pump can range from about 10 lbf to about 20 lbf. An actuation forces in this range is far too excessive for most ordinary consumers. Such an actuation force at this level can quickly fatigue the finger and hand of even the most physically adept person, let alone the typical users of most finger pumps.

Thus, a need exists for a manually-actuated spray pump that is capable of delivering substantially higher hydraulic pressures than conventional spray pumps without a corresponding increase in the actuation force which can be used to provide an ultra fine spray from a non-aerosol dispenser.

SUMMARY OF THE INVENTION

In one aspect of the invention, a manually-actuated spray pump for dispensing a fluid is provided. The spray pump comprises a nozzle through which the fluid is dispensed and a pumping engine. The pumping engine comprises a reservoir, a closure, and a plunger. The reservoir has an open top, a closed bottom, and an interior surface. The plunger has an outer surface and a longitudinal passageway extending therethrough. The plunger further has an outlet valve mounted therein and has an upper end and a lower end. The lower end of the plunger is slidably disposed within the open top of the reservoir forming an interior chamber within the reservoir. The interior chamber has an annular chamber and a main chamber. The annular chamber is in fluid communication with the main chamber. The annular chamber is formed by the outer surface of the plunger being spaced away from the interior surface of the reservoir such that there is no frictional contact between the outer surface of the plunger and the interior surface. The closure is attached to the open top of the reservoir and has an aperture therein allowing the plunger to slidably extend through the closure such that the interior chamber is sealingly closed. The main chamber is formed from a remainder of the interior chamber. Thus, the annular chamber and the main chamber are portions of the interior chamber with volumes that vary inversely during movement of the plunger within the reservoir. The annular chamber increases in volume and the main chamber decreases in volume during application of an actuation force. The nozzle is mounted on the upper end of the plunger such that the longitudinal passageway is in fluid communication with the nozzle. The interior chamber is separated from the longitudinal passageway by the outlet valve. This spray pump is operable in response to the application of an actuation force upon the nozzle causing the plunger to move within the reservoir and pressurize the fluid within the interior chamber such that a high hydraulic pressure is generated within the interior chamber in response to the movement of the plunger. The outlet valve opens in response to the high hydraulic pressure thereby allowing a portion of the fluid to flow from the interior chamber through the longitudinal passageway and through the nozzle wherein the actuation force used to generate such high hydraulic pressure is lower compared to conventional spray pumps that generate the same high hydraulic pressure.

In a second aspect of the present invention, a peripheral ring is affixed to the outer surface of the plunger and is in slidable contact with the interior surface of the reservoir. The peripheral ring separates or defines a boundary between the annular chamber and the main chamber. The peripheral ring also has a flow path extending therethrough allowing the annular chamber to be in fluid communication with the main chamber.

In another aspect of the present invention, the peripheral ring has an upper sealing surface extending to the interior surface of the reservoir and a lower sealing surface extending to the interior surface of the reservoir. The upper sealing surface and the lower sealing surface are in slidable sealing contact with the interior surface of the reservoir.

BRIEF DESCRIPTION OF THE DRAWINGS

While the specification concludes with claims which particularly point out and distinctly claim the invention, it is believed that the present invention will be better understood from the following description taken in conjunction with the appended claims and the accompanying drawings, in which like reference numerals identify identical elements and wherein;

DETAILED DESCRIPTION OF THE INVENTION

Figure 1:
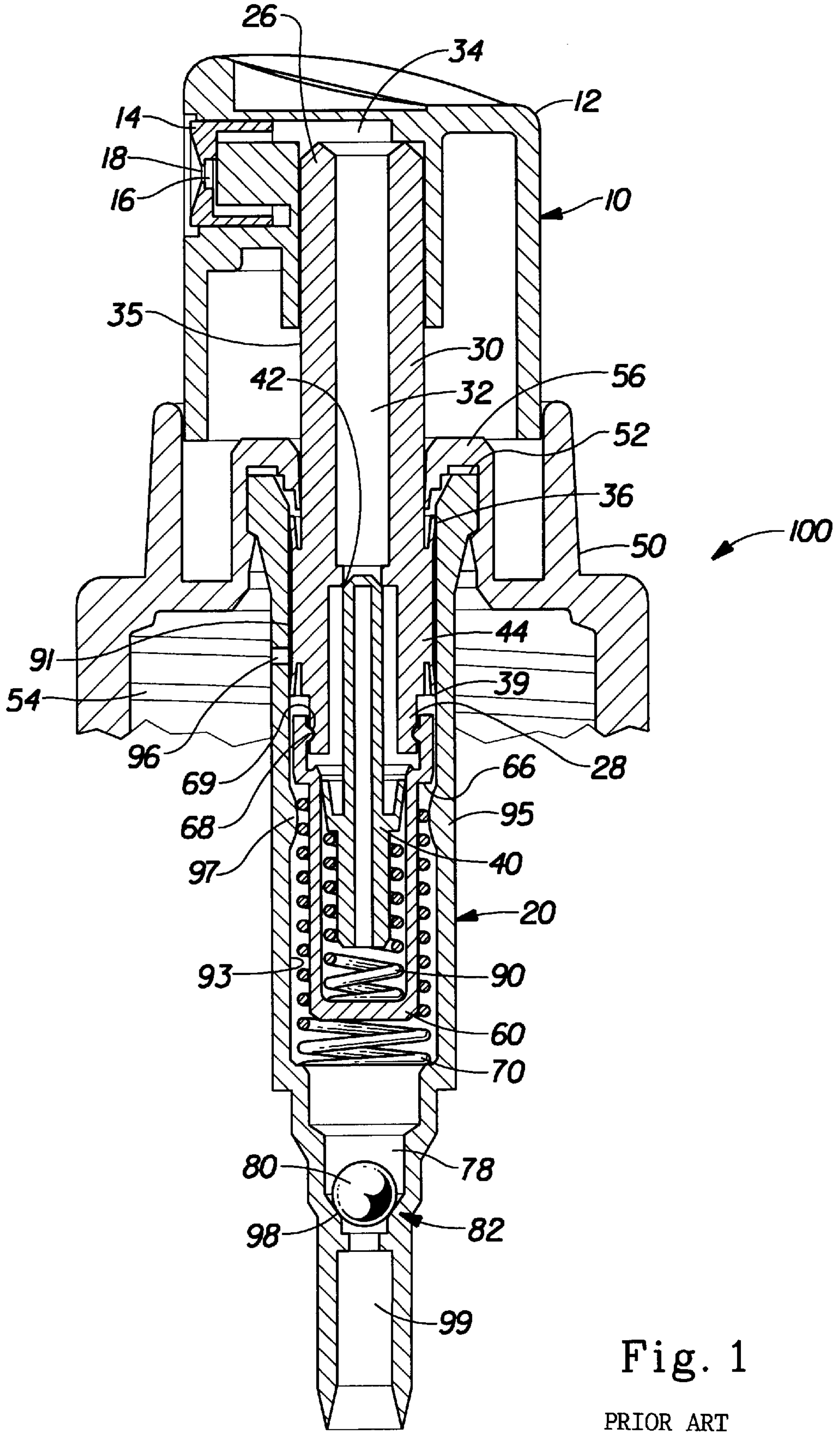
Fig. 1 PRIOR ART
FIG. 1 is a vertical, cross-sectional view of a conventional spray pump.

Referring now to the drawings, FIG. 1 depicts a conventional spray pump, designated generally as 100, of which the present invention is an improvement. As shown in FIG. 1, the conventional spray pump 100 consists of a nozzle, designated generally as 10, and a pumping engine, designated generally as 20, which are adapted for connection to a container (not shown) in which the fluid to be dispensed can be stored. The nozzle 10 includes an actuator head 12, a channel 34, and a nozzle insert 14 having an exit orifice 18. The nozzle insert 14 can be press fit into the actuator head 12 such that it is in fluid communication with the channel 34. Formed within the nozzle insert 14 is a swirl chamber 16 for transforming a pressurized fluid into an atomized spray.

The pumping engine 20 shown in FIG. 1 comprises a stem or plunger 30, a reservoir 95, a closure 50, a precompression spring 90, a return spring 70, a poppet 40, a retainer cup 60, and a closed bottom 82. The plunger 30, having an outer surface 35, extends downwardly from the channel 34 in the nozzle 10 and the plunger 30 also includes a longitudinal passageway 32 for conveying fluid to the nozzle 10. The plunger 30 has a piston or peripheral ring 44 formed at a lower end 28 thereof opposite the nozzle 10 which is attached at an upper end 26 thereof. The peripheral ring 44 extends radially outwardly from the plunger 30. The peripheral ring 44 includes an upper sealing surface 36 extending upward from the peripheral ring 44 and a lower sealing surface 39 extending downward from the peripheral ring 44. The upper and lower sealing surfaces 36 and 39 are annular in shape and create a leak tight seal between the peripheral ring 44 and an interior surface 93 of the reservoir 95.

The reservoir 95, in the shape of a cylinder, is connected at an open top 52 thereof to the closure 50 adjacent to the plunger 30. The reservoir 95 extends downwardly and can be disposed within a container (not shown). An annular gap 91 is formed between the interior surface 93 of the reservoir 95 and the upper and lower sealing surfaces 36 and 39 of the peripheral ring 44. The reservoir 95 includes a vent hole 96 extending from the interior surface 93 through to the outside of the reservoir 95 such that the vent hole 96 forms a vent from the annular gap 91. The reservoir 95 also includes a priming blip 97 protruding from the interior surface 93 inwardly. This priming blip 97 does not extend continuously around the periphery of the interior surface 93 and the priming blip 97 can be located at one point along the circumference of the interior surface 93. In addition, a valve seat 98 is located at the closed bottom 82 of the reservoir 95. The closed bottom 82 is formed by the valve seat 98 which acts in conjunction with a ball 80, such tat the ball 80 rests in the valve seat 98. When constructed in this manner the closed bottom 82 is in the form of an inlet valve 82 which controls the transfer of fluid from the container (not shown) into an interior chamber 78. A boss 99 is located on the reservoir 95 below the valve seat 98. The boss 99 is adapted to receive a dip tube (not shown). The dip tube (not shown) is used for conveying fluid from the container (not shown) to the inlet valve 82.

As shown in FIG. 1, the interior chamber 78 of the reservoir 95 is positioned below the peripheral ring 44 on the plunger 30. Thus, the interior chamber 78 is situated wholly below the peripheral ring 44. A more detailed description of the features and components of such a conventional spray pump 100 can be found in, for example, U.S. Pat. No. 5,064,105 issued Nov. 12, 1991 to Montaner and U.S. Pat. No. 5,025,958, issued Jun. 25, 1991 to Montaner et al., which are hereby incorporated herein by reference. Conventional spray pumps 100 of this general type are, for example, commercially available versions sold by Calmar Dispensing Systems Inc. under the trade name "Mark IV Fine Mist Sprayer".

In accordance with the present invention, it has been determined that the actuation force required by the conventional spray pump 100, shown in FIG. 1, can be reduced by reducing the area of the peripheral ring 44. This can be achieved by reducing the effective area on which the hydraulic pressure acts. For example, if a solid circular surface has a given diameter, and thus a certain measurable area, and this diameter is reduced, it is this reduction in diameter or size that reduces the measurable area of the solid circular surface. Since, the force equation is pressure multiplied by area ($F=P*A$), where F=force, P=pressure, and A=area, for a given value of P which acts normal to all the surfaces, if A is reduced then F is also reduced proportionally. The effective area (A) is defined as the cross-sectional area of the plunger 30 that when multiplied by the distance the plunger 30 has moved within the reservoir 95 it equates to the volume of fluid displaced. In the present invention, the effective area (A) of the peripheral ring 44 is reduced and thus, the actuation force (F) required to create the hydraulic pressure (P) in the interior chamber 78, is reduced. Preferably, this actuation force is less than about 10 lbf (44.5 N), and more preferably, the actuation force is less than about 7 lbf (31.1 N).

Figure 2A:
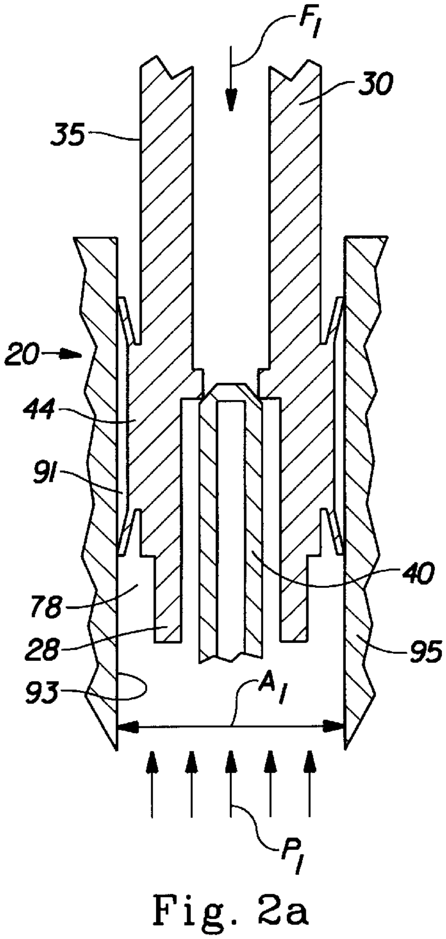
Fig. 2a PRIOR ART
FIG. 2*a* is a simplified partial cross-sectional view of a pumping engine illustrating the force balance in a conventional spray pump.
Figure 2B:
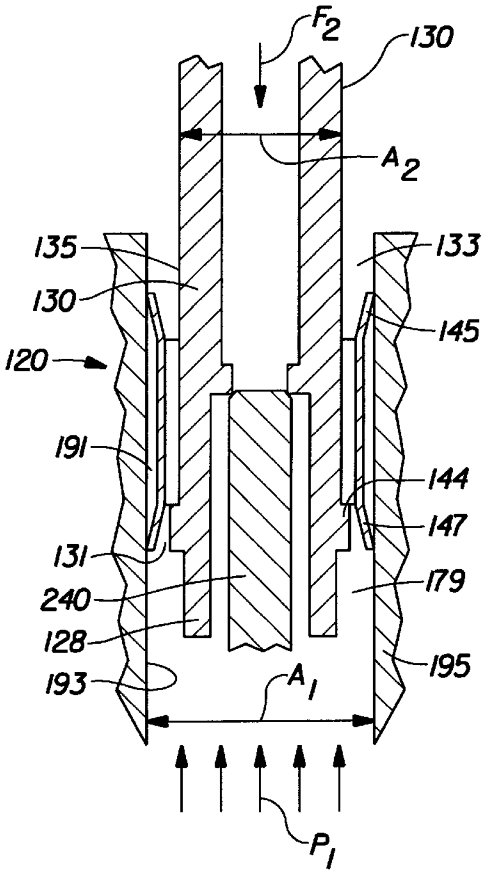
FIG. 2*b* is a simplified partial cross-sectional view of a pumping engine illustrating the force balance in a spray pump incorporating the present invention.

FIG. 2*a* illustrates a simplified partial cross-sectional drawing of the pumping engine 20 of a conventional spray pump 100 and FIG. 2*b* illustrates a simplified partial cross-sectional drawing of the pumping engine 120 of a high pressure manually-actuated spray pump 300 according to the present invention. The pumping engine 120 of the present invention as shown in FIG. 2*b*, provides a novel way of reducing the effective area (A) of the peripheral ring 144, and thus the required actuation force. The effective area of the peripheral ring 144 is reduced by providing at least one flow path 131 that extends through the peripheral ring 144 between a main chamber 179 and an annular chamber 133. This flow path 131 allows fluid from the main chamber 179 to flow through to communicate with, and pressurize the annular chamber 133.

In FIG. 2*a* the plunger 30 and the peripheral ring 44 of the pumping engine 20 are shown having an actuation force of $F_1=P_1*A_1$. In contrast, the peripheral ring 144 and the plunger 130 of the pumping engine 120, incorporating the present invention as shown in FIG. 2*b*, have an actuation force of $F_{2=P1}*A_2$. Since $P_1$, which acts normal to all the surfaces, $A_1$, and $A_2$ are always positive numbers, and since $A_2$ is less than $A_1$, the actuation force $F_2$ will be less than $F_1$. Restated, the present invention alters the force equation by reducing the effective area of the peripheral ring 144, thereby reducing the actuation force required to dispense the fluid. This reduction in area however, results in less fluid being displaced from the pumping engine 120 for an equivalent length of stroke.

Figure 3:
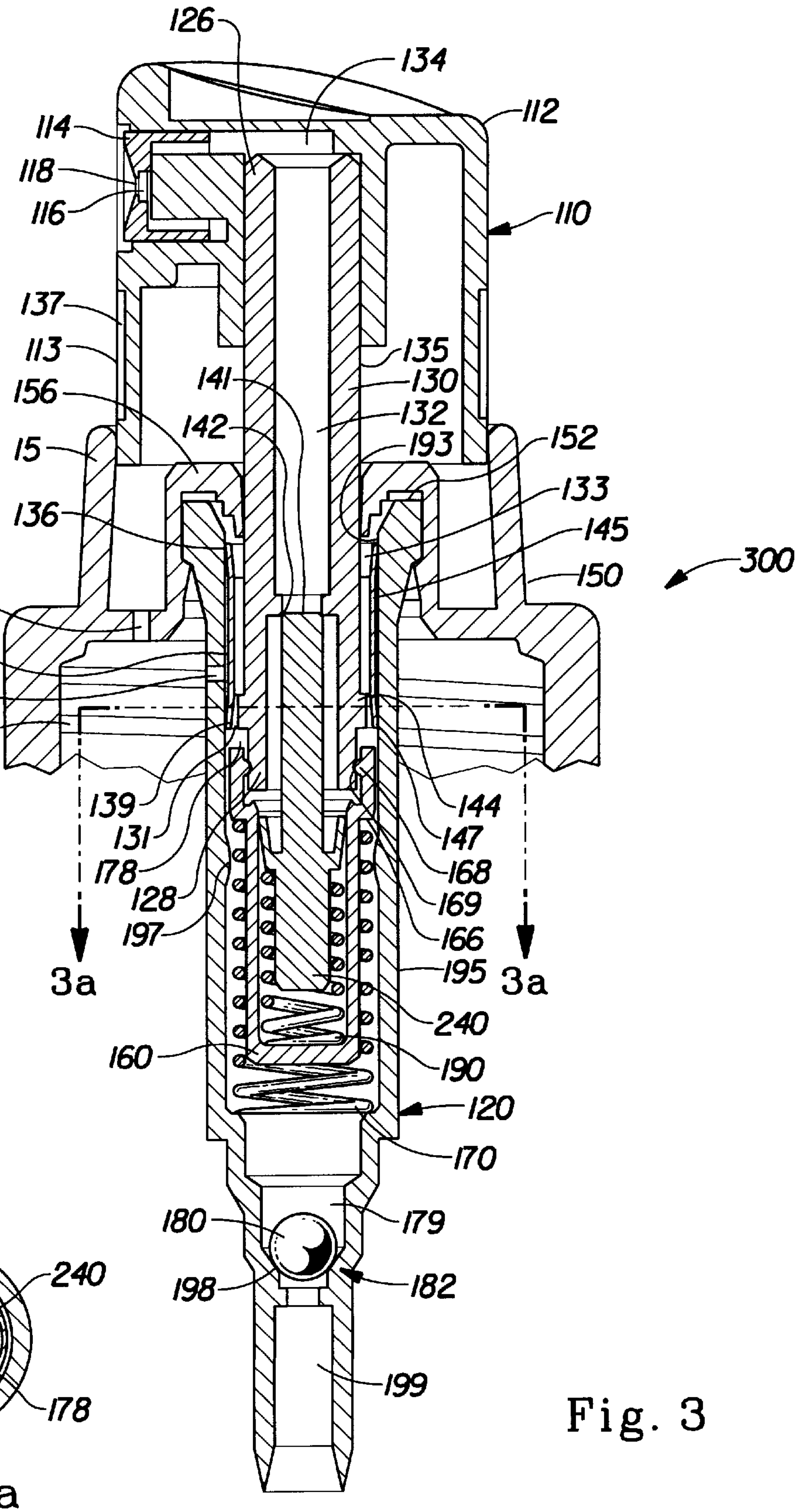
FIG. 3 is a vertical, cross-sectional view of a spray pump incorporating the present invention, shown in a fully upright position.
Figure 4:
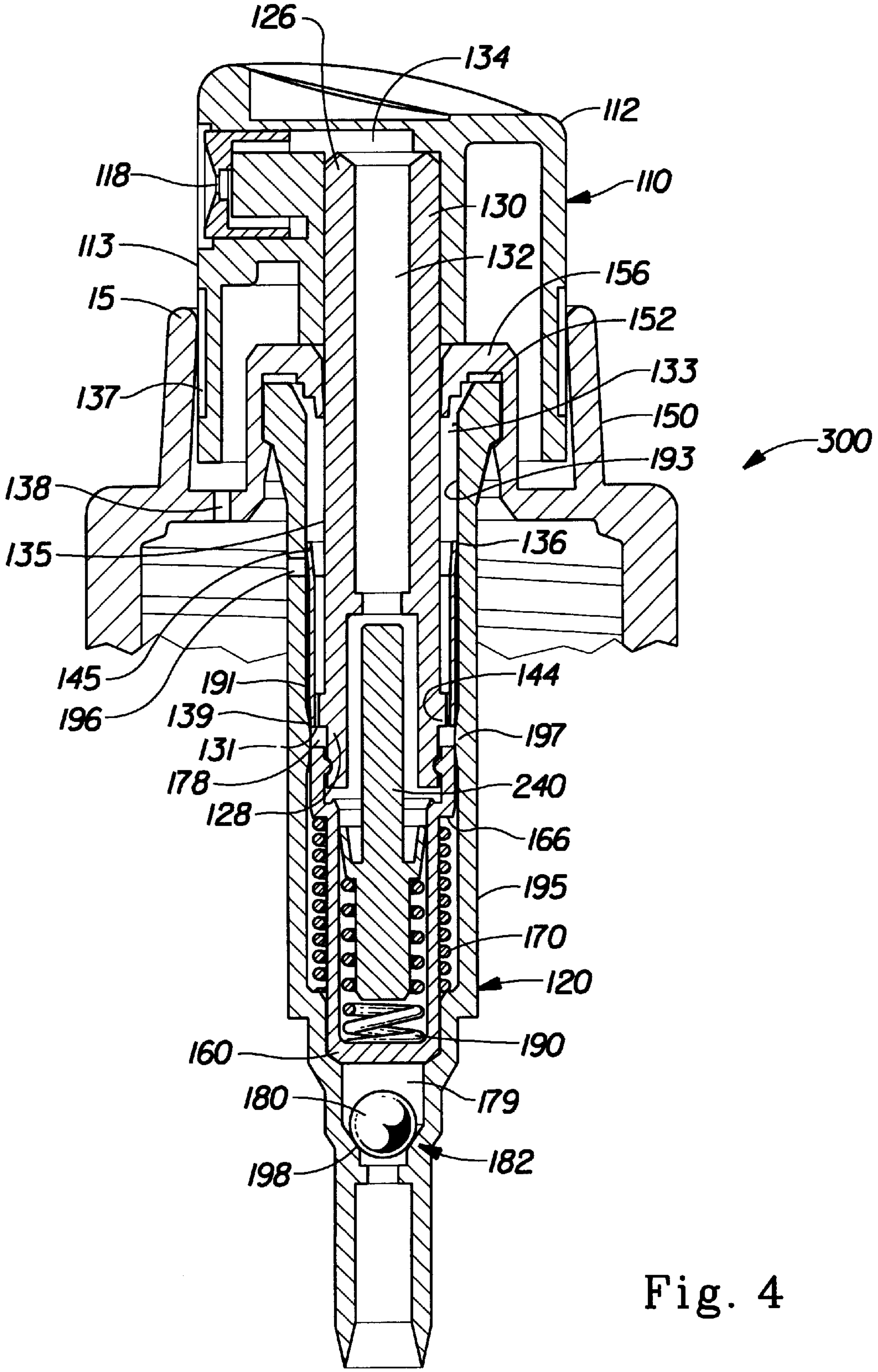
FIG. 4 is a vertical, cross-sectional view of the spray pump of FIG. 3 shown in a retracted, end-of-stroke position.

FIG. 3 and 4 illustrate the high pressure manually-actuated spray pump 300 of the present invention in greater detail. FIG. 3 illustrates the high pressure manually-actuated spray pump 300 in the fully upright position, while FIG. 4 illustrates the high pressure manually-actuated spray pump 300 in a retracted, end of stroke position. As shown in FIG. 3, the present invention has many of the same components and operational characteristics and is an improvement of the conventional spray pump 100, shown in FIG. 1. However, the spray pump 300, shown in FIG. 3, incorporates a flow path 131 into the peripheral ring 144. The flow path 131 allows fluid to travel from the main chamber 179, past the lower sealing surface 139 and past the upper sealing surface 136, and into the annular chamber 133 which is, preferably, provided above the peripheral ring 144. The interior chamber 178 is made up of and includes the main chamber 179, the annular chamber 133, and the flow path 131. The interior chamber 178, thus, comprises all the open space within the reservoir 195 that is in fluid communication with the annular chamber 133 when the inlet valve 182 and the outlet valve 142 are closed. In this embodiment, the annular chamber 133 is formed between the upper sealing surface 136 and the outer surface 135 of the plunger 130 and also between the interior surface 193 of the reservoir 195 and the outer surface 135. The annular chamber 133 can be formed in various other manners and between various other components. For example, and not by way of limitation, the annular chamber 133 can be formed as a cavity located wholly within the plunger 130; the annular chamber 133 can be formed as a cavity located partially within the inner lip 156 of the closure 150, or any combination of these and various other components. Preferably, the annular chamber 133 is of a smaller volume than the main chamber 179 prior to initiation of a dispensing cycle and preferably, the annular chamber 133 is located above the main chamber 179. Thus, the annular chamber 133 and the main chamber 179 are portions of the interior chamber 178 with volumes that vary inversely during movement of the plunger 130 within the reservoir 195. Additionally, the annular chamber 133 is preferably annular in shape but can be of any number of various volumetric shapes or geometric configurations. The main chamber 179 is formed of a remainder of the interior chamber 178 extending to the closed bottom 182, not including the annular chamber 133 or the flow path 131. Preferably, the closed bottom 182 is in the form of an inlet valve 182. More preferably, the closed bottom 182 has a valve seat 198 and a ball 180 forming the inlet valve 182 therein which allows the fluid to enter the interior chamber 178.

The plunger 130, as shown in FIG. 3, has a longitudinal passageway 132 extending axially therethrough and an upper end 126 and a lower end 128. The nozzle 110 is fixedly mounted on the upper end 126 of the plunger 130 such that the longitudinal passageway 132 is in fluid communication with the nozzle 110. Opposite the nozzle 110 which is affixed to the plunger 130 at the upper end 126, the peripheral ring 144 located or formed at the lower end 128 of the plunger 130. Preferably, the peripheral ring 144 extends radially outward from the plunger 130. More preferably, the peripheral ring 144 is made integral to the plunger 130. Alternatively, the peripheral ring 144 can be made as a separate piece that is attached onto the outer surface 135 of the plunger 130. In this embodiment, the peripheral ring 144 has an upper sealing surface 136 extending to the interior surface 193 of the reservoir 195 and a lower sealing surface 139 extending to the interior surface 193 of the reservoir 195. Preferably, the upper sealing surface 136 extends substantially upward and radially outward from the peripheral ring 144 and the lower sealing surface 139 extends substantially downward and radially outward from the peripheral ring 144. More preferably, the upper and lower sealing surfaces 136 and 139 are annular in shape. The upper sealing surface 136 and the lower sealing surface 139 are in slidable sealing contact with the interior surface 193 of the reservoir 195. Thus, the spray pump 300 has a reservoir 195 with an interior surface 193 that is in sliding contact with the upper and lower sealing surfaces 136 and 139 which create a leak tight seal between the peripheral ring 144 and the interior surface 193 of the reservoir 195. Preferably, the peripheral ring 144 is spaced away from the interior surface 193 by the upper and lower sealing surfaces 136 and 139. More preferably, the peripheral ring 144 has at least one axial flow path 131 extending therethrough allowing fluid to be in communication throughout the interior chamber 178 and allowing fluid to flow from the main chamber 179 into the annular chamber 133.

The equation for approximating the pressure drop of the fluid through the flow path 131 is given by:

$$\Delta P=[128*Q*\mu*L]/[\pi*D_h^4]$$

where ΔP is the pressure drop across the flow path 131, $\mu$ is the viscosity of the fluid, Q is the flow rate through the flow path 131, $D_h$ is the hydraulic diameter of the flow path 131, and L is the length of the flow path 131. The hydraulic diameter is equivalent to an effective diameter of the cumulative flow path 131 areas. For a given flow rate (Q) of fluid moving into the annular chamber 133, the pressure drop (ΔP) across the flow path 131 increases as the hydraulic diameter ($D_h$) decreases. As the hydraulic diameter ($D_h$) becomes sufficiently small the pressure drop (ΔP) becomes large enough that the pressures inside the annular chamber 133 and main chamber 179 are no longer equivalent. When this condition occurs, the actuation force (F) required to be applied upon the actuator head 112 by a consumer to dispense product will increase due to increase in hydraulic pressure (P) in the main chamber 179.

Figure 3A:
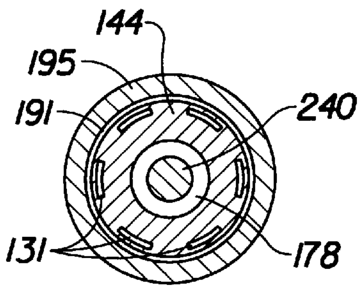
FIG. 3*a* is a full annular cross-section of the spray pump of FIG. 3 taken along line 3*a*—3*a;*

Referring now to FIG. 3*a*, which is a full annular cross-section of the spray pump 300 taken along line 3*a*–3*a*, the flow paths 131 are shown in more detail. The reservoir 195, annular gap 191, peripheral ring 144, interior chamber 178, and poppet 240 are all shown in this cross-section. The peripheral ring 144 is shown having multiple flow paths 131 extending therethrough. Although the flow paths 131 are depicted as being generally rectangular in shape, numerous other shapes and configurations could be utilized. For example and not by way of limitation, the flow paths 131, shown in FIG. 3*a*, could be circular, oval, square, octagonal, irregular, serrated, sinusoidal, oblong, and the like. Additionally, as shown in FIG. 3, these flow paths 131 are tapered in the axial direction. However, the flow paths 131 can also be arranged in many other configurations, for example and not by way of limitation, conical, curved, converging, diverging, parallel, irregular, and the like. These flow paths 131 can be of many different shapes and configurations so long as fluid is allowed to pass through the flow path 131.

Figure 5:
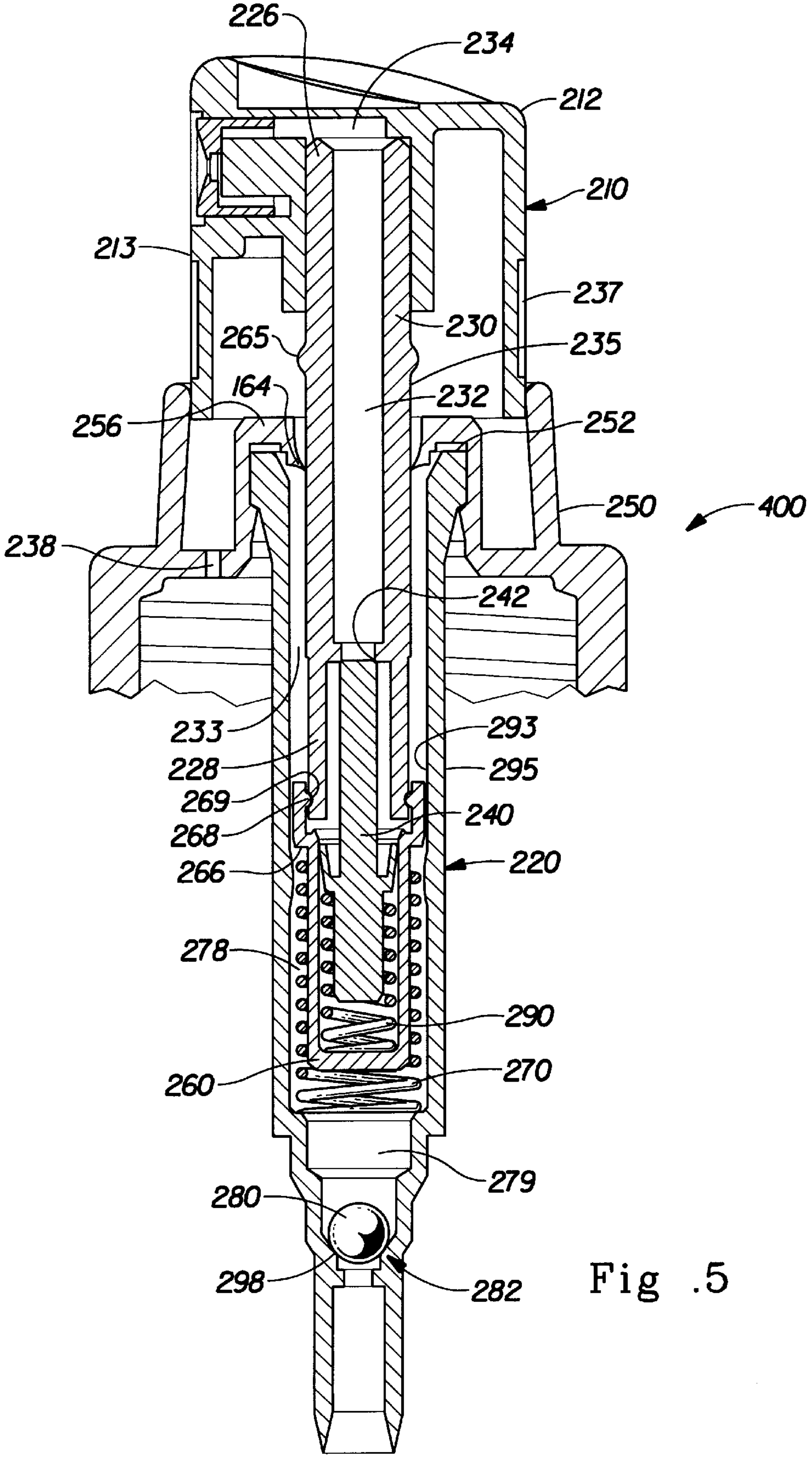
FIG. 5 is a vertical, cross-sectional view of a first alternative embodiment of a spray pump incorporating the present invention.
Figure 6:
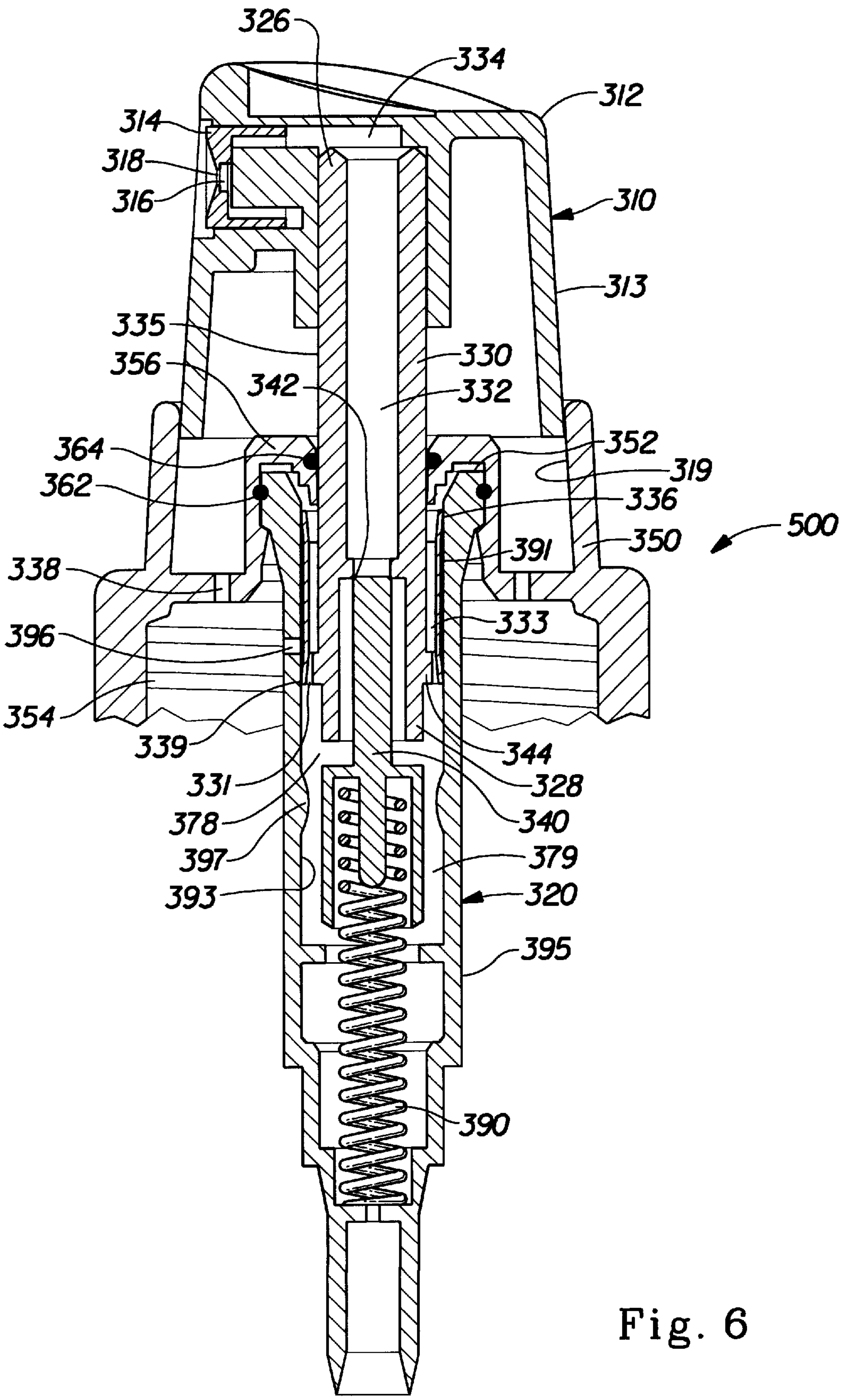
FIG. 6 is a vertical, cross-sectional view of a second alternative embodiment of a spray pump incorporating the present invention.

The closure 150, as shown in FIG. 3, extends circumferentially about the plunger 130 and the reservoir 195. The closure 150 is attached to the open top 152 of the reservoir 195 and has an aperture therein allowing the plunger 130 to slidably extend through the closure 150 such that the interior chamber 178 is sealingly closed In addition, the closure 150, preferably, includes internal threads 154 for attaching the closure 150 onto a container (not shown) in a leak tight manner. Various alternative methods of attaching the closure 150 onto the container can be utilized. Preferably, the closure 150 further has an inner lip 156 wherein the inner lip 156 engages the open top 152 of the reservoir 195 thereby attaching the closure 150 to the reservoir 195. The inner lip 156 sealingly engages the open top 152 providing sealing of the interior chamber 178 adjacent to the annular chamber 133. The inner lip 156 also defines the periphery of the aperture in the closure 150 and the inner lip 152 is in slidable sealing contact with the outer surface 135 of the plunger 130 at a location between the upper end 126 and the lower end 128. In the present embodiment, shown in FIG. 3, sealing of the interior chamber 178 is provided by sizing the mating components to allow a frictional or sliding seal in order to prevent leakage from the annular chamber 133 and seal off the interior chamber 178. Alternatively, as shown in FIG. 5, a stem seal 164 of the wiper seal variety can be provided which is, preferably, inter to the inner lip 256. Many additional sealing arrangements can also be utilized, for example, as shown in FIG. 6, an outer closure seal 362 and a stem seal 364 can be provided in order to prevent leakage of fluid from the annular chamber 333. The outer closure seal 362 is preferably, positioned between the closure 350 and the reservoir 395 adjacent to the open top 352 of the reservoir 395. The stem seal 362 is preferably, positioned between the plunger 330 and the closure 350 in order to assure that no fluid leaks from the annular chamber 333 into the nozzle 310 around the plunger 330. Preferably, the outer closure seal 362 and a stem seal 364 are constructed of a resilient material.

As further shown in FIG. 3, the pumping engine 120 further comprises a retainer cup 160 attached to the plunger 130 at the lower end 128 which extends within the main chamber 179 and the pumping engine 120 further comprises a poppet 240 slidably or movably disposed within the retainer cup 160 adjacent to the longitudinal passageway 132. An outlet valve 142 is shown formed by the poppet 240 being biased against the longitudinal passageway 132 by a precompression spring 190. The poppet 240 is disposed in the lower end 128 of the plunger 130 so as to be slidable or moveable away from the longitudinal passageway 132. Preferably, this movement of the poppet 240 is a translational type movement in which the poppet 240 translates from a first position, blocking the longitudinal passageway 132, to a second position, spaced away from the longitudinal passageway 132 and vice versa. The precompression spring 190, preferably, is disposed about the outer circumference of the poppet 240. The poppet 240 and the precompression spring 190 are both located within a retainer cup 160 which is connected to the lower end 128 of the plunger 130 by a knob 168 and recess 169 that create a snap fit engagement between the retainer cup 160 and the plunger 130. The knob 168 and recess 169 are, preferably, in the form of multiple prongs which allow fluid to pass between open spaces thereof and surround the poppet 240 adjacent to the lower end 128. The precompression spring 190 acts in conjunction with a retainer cup 160 to urge the poppet 240 upward and thus the poppet 240 is biased against the longitudinal passageway 132 in order to form the outlet valve 142. Preferably, the outlet valve 142 opens when a predetermined hydraulic pressure is reached within the interior chamber 178. The return spring 170 is positioned within the interior chamber 178 between the reservoir 195 and the retainer cup 160 and is preferably, disposed about the retainer cup 160. The return spring 170 engages and pushes against a rim 166 located on the retainer cup 160. The return spring 170 urges the retainer cup 160, plunger 130 and nozzle 110 upward and maintains them in an upright, rest position prior to initiation of a dispensing cycle.

Additionally, in order to compensate for a high hydraulic pressure, the stiffness of the precompression spring 190 can be increased. A stiffer precompression spring 190 could utilize wire coils having, for example, larger diameters or stiffer materials. A stiffer precompression spring 190 increases the hydraulic pressure required to move the poppet 240 away from the longitudinal passageway 132 thereby preventing opening of the outlet valve 142 until the desired high hydraulic pressure criteria is met. A poppet 240 of greater strength, for example, a solid configuration rather than a hollow configuration, can be utilized in order to provide greater durability when using the stiffer precompression spring 190. Also, a flattened poppet surface 141 can be provided on the poppet 240 at the outlet valve 142 in order to reduce wear on the poppet 240.

While the high pressure manually-actuated spray pump 300 of the present invention can be primed in the same manner as the conventional spray pump 100, shown in FIG. 1, the venting scheme for the container is modified. To permit venting of the container (not shown), a closure venting hole 138 is provided on the closure 150 and a flute 137 is provided on the nozzle 110. The flute 137 is, preferably, in the form of a recessed area on the nozzle surface 113. The actuator head 112 of the nozzle 110 is sealed along its circumference by maintaining contact with an upper skirt 15 of the closure 150 around the periphery of the nozzle surface 113 when the spray pump 300 is in the fully upright position. Referring now to FIG. 4, during operation the actuator head 112 moves downward upon the application of an actuation force. When the actuator head 112 moves downward the flute 137 becomes aligned just inboard of the upper skirt 15 and, in the retracted position, the upper skirt 15 is spaced away from the nozzle surface 113 thereby providing an air gap for venting of the container. Air is thus allowed to communicate between the container and atmosphere through the closure venting hole 138. Alternatively, as shown in FIG. 6, venting of the container can be provided by having the nozzle surface 313 and a skirt surface 319 tapered or in sloped relation such that when the spray pump 500 is in the fully upright position there is circumferential contact between the skirt surface 319 and the nozzle surface 313. However, when the actuator head 312 moves downward an air gap is formed between the skirt surface 319 and the nozzle surface 313, thereby venting the container. A container venting scheme which can increase the actuation force, for example, a protrusion on the nozzle 110 or closure 150 which is used to deflect another component in order to form an air gap, may not be preferred, however, such venting schemes, as well as various other venting schemes, are well known to those skilled in the art and can be provided without departing from the invention disclosed herein.

As shown in FIG. 4, since the interior chamber 178 may be initially filled with air, priming of the pumping engine 120 is accomplished by moving the plunger 130 downward to pressurize the air within the interior chamber 178. As the plunger 130 moves downward, the lower sealing surface 139 on the peripheral ring 144 contacts the priming blip 197, thereby lift part of the lower sealing surface 139 off of the interior surface 193 and allowing air to pass into the annular gap 191 and then out through the vent hole 196. This release of air from the interior chamber 178 produces a vacuum within the interior chamber 178 during a return stroke of the plunger 130 as the return spring 170 urges the plunger 130 and nozzle 110 back to their upright positions. This vacuum pulls or sucks fluid through the inlet valve 182 and into the interior chamber 178, thereby filling the main chamber 179 of the interior chamber 178 with fluid.

In order to initiate a dispensing cycle a user applies an actuation force by pressing downward with the user's hand or fingers on the actuator head 112. Preferably, this actuation force is less than about 10 lbf (44.5 N), and more preferably, the actuation force is less than about 7 lbf (31.1 N). This actuation force urges the nozzle 110, the plunger 130 and the peripheral ring 144 to move downward within the reservoir 195, thereby pressurizing the fluid in the interior chamber 178. In the present invention, as the hydraulic pressure builds throughout the entire interior chamber 178 and as the plunger 130 is moved downward, the annular chamber 133 increases in volume and the main chamber 179 decreases in volume. A portion of the fluid contained within the main chamber 179 will flow through the flow path 131 into the annular chamber 133. Since the main chamber 179 and the annular chamber 133 are in fluid communication through the flow path 131, the hydraulic pressure within each chamber is essentially equivalent throughout the interior chamber 178.

As the plunger 130 and the peripheral ring 144 move downward within the reservoir 195 in response to the actuation force applied on the actuator head 112 of the nozzle 110, the fluid in the entire interior chamber 178 becomes increasingly pressurized. The precompression spring 190 is selected such that its spring force is overcome at a predetermined high hydraulic pressure. When the pressure within the interior chamber 178 reaches the predetermined high hydraulic pressure, the spring force of the precompression spring 190 is overcome and the poppet 240 is pushed away from the longitudinal passageway 132 by the high hydraulic pressure, thereby opening the outlet valve 142. As used herein a high hydraulic pressure is the maximum value that the hydraulic pressure reaches within the interior chamber 178. Preferably, the hydraulic pressure within the interior chamber 178 reaches a maximum value of at least between about 120 psig (827 kPa) to about 200 psig (1379 kPa), and more preferably, a maximum value of about 200 psig (1379 kPa). When the outlet valve 142 is opened, pressurized fluid travels up the longitudinal passageway 132, through the nozzle 110 via the channel 134 and is dispensed out of the exit orifice 118. Preferably, the fluid is dispensed from the spray pump 300 in an ultra fine spray. Ultra fine sprays as used herein have a mean particle size of about 40 microns or less. At the end of the downward actuation stroke, the hydraulic pressure in the interior chamber 178 decreases below the predetermined high hydraulic pressure due to the release of fluid through the nozzle 110, permitting the precompression spring 190 to again urge or bias the poppet 240 against the longitudinal passageway 132 to close the outlet valve 142, thereby ceasing the flow of fluid. When the user releases the actuator head 112 by removing the actuation force, the return spring 170 pushes against the rim 166 of the retainer cup 160 to urge the retainer cup 160, the plunger 130 and the nozzle 110 to return to their original upright, positions. As the retainer cup 160 and the plunger 130 move upward, a vacuum is generated in the interior chamber 178 causing the ball 180 to lift off the valve seat 198, allowing fluid to be drawn upward and flow past the inlet valve 182 and to replenish the fluid in the interior chamber 178 for the next dispensing cycle.

The actuation force is dependent on the method or manner in which fluid is dispensed from the spray pump 300 and the rate at which the plunger 130 travels downward. The actuation force for this spray pump 300 is measured using, for example, an Instron model 8501 universal testing machine in order to generate the dispensing cycle and a Nicolet model 410 digital oscilloscope in order to record the measurements and collect the data. The actuator head 112 of the nozzle 110 is downwardly depressed at a rate of about 3 inches per second by the Instron model 8501 in order to simulate a typical consumer moving the plunger 130 downward. A distance of about 0.22 inches is the total distance that the plunger 130 travels which equates to the overall pump stroke. The overall pump stroke is limited by the length of the reservoir 195 and the configuration of the interior chamber 278. Data plots representing the time, distance, and actuation force are generated. Testing is performed at room temperature conditions of about 72° F.

As can be seen in FIG. 4, the annular chamber 133 has expanded in size as the plunger 130 and the peripheral ring 144 have moved down within the reservoir 195. Some portion of the fluid from the main chamber 179 has been transferred through the flow path 131 into the annular chamber 133 above the peripheral ring 144 and some portion of the fluid from the main chamber 179 has been dispensed out of the nozzle 110 through the longitudinal passageway 132. Thus, the present invention enables the effective area of the peripheral ring 144 to be reduced, thereby reducing the actuation force required to dispense fluid from the pumping engine 120.

Since some portion of the fluid is transferred from the main chamber 179 to the annular chamber 133 above the peripheral ring 144 during the dispensing cycle, less fluid is available to be dispensed through the nozzle 110 per equivalent length of stroke of the plunger 130. The volume of fluid dispensed during a single dispensing cycle is referred to as the pump dose which is equivalent to the overall pump stroke in distance multiplied by the effective area of the plunger 130. In order to compensate for any variations in pump dose, the pump stroke can be lengthened or shortened to provide approximately an equivalent pump dose as supplied in a conventional spray pump. It can be seen that the pump dose can be increased or decreased in this manner. The pump stroke, in this preferred embodiment, is increased by increasing the length of the reservoir 195, plunger 130, and return spring 170 along with various other component parts within the pumping engine 120. Thus, an equivalent or most any other desired pump dose can be obtained.

In a first alternative embodiment of the high pressure manually-actuated spray pump 400, as shown in FIG. 5, the peripheral ring 144 of FIG. 3 has been removed or reduced in diameter and the annular chamber 233 is in direct fluid communication with the main chamber 279 thus, forming the interior chamber 278. This reduction in diameter can be such that the diameter of the peripheral ring 144 of FIG. 3 is now substantially the same as the diameter of the plunger 230 or some intermediate stage of greater or lesser diameter wherein the flow path 131 of FIG. 3 has simply become an annular ring about the periphery of the plunger 230 and is thus incorporated into the annular chamber 233. As shown in FIG. 5, the annular chamber 233 is formed between the outer surface 235 of the plunger 230, the interior surface 293 of the reservoir 295 and the closure 250. Thus, in this embodiment, fluid within the interior chamber 278 can freely flow between the annular chamber 233 and the main chamber 279.

As shown in FIG. 5, the effective area of the peripheral ring 144 of FIG. 3 is reduced and in essence becomes equivalent to the effective area of the plunger 230. In operation, as the plunger 230 and the poppet 240 move downwardly within the reservoir 295 in response to an actuation force on the nozzle 210, fluid is displaced within the interior chamber 278 and the fluid becomes increasingly pressurized. When the hydraulic pressure in the interior chamber 278 reaches a predetermined high hydraulic pressure, the poppet 240 will be pushed away from the longitudinal passageway 232 to release fluid through the longitudinal passageway 232, and through the nozzle 210 via the channel 234 in order to be dispensed. Additionally, venting of the interior chamber 278 is accomplished when the bulb 265, located above the stem seal 164 on the outer surface 235 of the plunger 230 and extending partially around the circumference of the plunger 230, moves downward and contacts the stem seal 164 allowing air to escape out of the interior chamber 278.

While the present invention has been described with respect to spray pumps that have a precompression spring 190 and a return spring 170, as shown in FIG. 3, it is to be understood that this invention can also be applied to other types of dual spring pumps, as well as to many single spring type spray pumps. In a second alternative embodiment, as shown in FIG. 6, a high pressure manually-actuated spray pump 500 is shown, in which the precompression spring 190 of FIG. 3 and the return spring 170 of FIG. 3, have been replaced with a single spring 390. In addition, the retainer cup 160 of FIG. 3, has also been eliminated in this embodiment. The poppet 340 is configured, as shown in FIG. 6, to move away from and into contact with the longitudinal passageway 332 as the hydraulic pressure increases and decreases respectively, thereby opening and closing the outlet valve 342. The single spring 390 functions similarly to the previous embodiments, with the exception that the single spring 390 acts in conjunction with the poppet 340 in order to return the plunger 330 and the nozzle 310 to their upright positions. Similar to the embodiment shown in FIG. 3, this second alternative embodiment incorporates an annular chamber 333 above the peripheral ring 344 which is in fluid communication with the main chamber 379 through at least one flow path 331 in the peripheral ring 344. When an actuation force is applied to the actuation head 312 of the nozzle 310 fluid becomes pressurized within the interior chamber 378. The interior chamber 378 is comprised of the annular chamber 333, the flow path 331 and the main chamber 379. When a predetermined high hydraulic pressure is reached, a portion of the fluid within the interior chamber 378 is displaced through the outlet valve 342 into the longitudinal passageway 332 and is dispensed from the nozzle 310. Thus, the flow path 331, as in the previous embodiments, provides a means for reducing the effective area of the peripheral ring 344, so that a high hydraulic pressure can be generated in the high pressure manually-actuated spray pump 500 without significantly increasing the actuation force required to initiate a dispensing cycle.

The present invention has been described with respect to a high pressure manually-actuated spray pump 500 for dispensing a fluid. Preferably, the fluid comprises a hair spray. However, it is to be understood that the present invention can be used for dispensing any number of various types of fluids, for example, hair sprays, cosmetics, perfumes, deodorants, antiperspirants, hard surface cleaners, carpet cleaners, oil based products, stain removers, laundry products, and the like. Although many materials can be used in the construction of this spray pump, preferably, the precompression spring 190, return spring 170 and single spring 390 are of a helical, metallic material such as stainless steel, and the ball 80 is preferably constructed of a metal or metallic material such as stainless steel, with all of the remaining components of this spray pump, preferably, being made of a plastic material such as polyethylene, polypropylene, or the like. The presently preferred plastics manufacturing process is injection molding.

Although particular versions and embodiments of the present invention have been shown and described, various modifications can be made to this high pressure manually-actuated spray pump without departing from the teachings of the present invention. The terms used in describing the invention are used in their descriptive sense and not as terms of limitation, it being intended that all equivalents thereof be included within the scope of the appended claims.

The following Example illustrates a fluid and spray pump combination which has been successfully prepared and which illustrates the relationship between the various parameters discussed in detail above.

EXAMPLE

A fluid suitable for use in a spray pump according to the present invention is a hair spray product prepared from the following components (% by weight):

| | |
|---|---|
| SD Alcohol 40 | 78.7600 |
| Water | 15.5243 |
| Octylacrylamide/Acrylates/Butylamineothyl Methacrylate Copolymer | 4.0000 |
| Aminomethyl Propanol | 0.7135 |
| Dimethicone Copolyol | 0.5000 |
| Cyclomethicone | 0.2400 |
| Ammonium C9–10 Perfluoroalkyl Sulfonate | 0.1400 |
| Fragrance | 0.1000 |
| Panthenol | 0.0100 |

-continued

| | |
|---|---|
| Octyl Salicylate | 0.0100 |
| Myristoyl Hydrolyzed Collagen | 0.0020 |
| Keratin Amino Acids | 0.0002 |
| | 100.0000% |

An exemplary spray pump according to the embodiment of the present invention depicted in FIG. 3, for use with the product described above, was constructed having the following details:

| | |
|---|---|
| Pumping Engine | M300 Finger Pump, Monturas, S. A. |
| Precompression Spring | K = 26.2 lb./in. |
| Flow Path Diameter | 0.018 inches |
| Quantity of Flow Paths | 30 |

When this fluid and spray pump combination was tested using the test method described above, an actuation force of 7.66 lbf was obtained at the time the outlet valve began to open.

What is claimed is:

1. A manually-actuated spray pump for dispensing a fluid, said spray pump comprising:

(a) a nozzle through which said fluid is dispensed;

(b) a pumping engine comprising a reservoir, a closure, and a plunger, said reservoir having an open top and a closed bottom and an interior surface, said plunger having an outer surface and a longitudinal passageway extending therethrough, said plunger further having an outlet valve mounted therein and an upper end and a lower end, said lower end being slidably disposed within said open top of said reservoir forming an interior chamber within said reservoir, said interior chamber having an annular chamber and a main chamber, said annular chamber being in fluid communication with said main chamber, said annular chamber being formed by said outer surface of said plunger being spaced away from said interior surface of said reservoir such that there is no frictional contact between said outer surface and said interior surface and providing for a reduced effective area on said plunger, said closure being attached to said open top of said reservoir allowing said plunger to slidably extend through said closure such that said interior chamber is sealingly closed, said main chamber is formed from a remainder of said interior chamber, said nozzle mounted on said upper end of said plunger such that said longitudinal passageway is in fluid communication with said nozzle, said interior chamber being separated from said longitudinal passageway by said outlet valve; and (c) said outlet valve comprises a poppet biased against said longitudinal passageway by a precompression spring, and said spray pump being operable in response to the application of an actuation force of less than about 10 lb causing said plunger to move within said reservoir and pressurize said fluid within said interior chamber such that a high hydraulic pressure of between about 120 psig to about 200 psig is generated within said interior chamber in response to the movement of said plunger, said outlet valve opening in response to said high hydraulic pressure thereby allowing a portion of said fluid to flow from said interior chamber through said longitudinal passageway to said nozzle.

* * * * *